United States Patent

Paya et al.

[11] Patent Number: 5,839,858
[45] Date of Patent: Nov. 24, 1998

[54] CUTTING INSERT, ESPECIALLY FOR MILLING

[75] Inventors: Jose Agustin Paya; Thomas Braun, both of Mülheim, Germany

[73] Assignee: Widia GmbH, Essen, Germany

[21] Appl. No.: 727,498

[22] PCT Filed: Mar. 29, 1995

[86] PCT No.: PCT/DE95/00435

§ 371 Date: Oct. 16, 1996

§ 102(e) Date: Oct. 16, 1996

[87] PCT Pub. No.: WO95/29784

PCT Pub. Date: Nov. 9, 1985

[30] Foreign Application Priority Data

May 3, 1994 [DE] Germany .......................... 44 15 453.4
Jun. 7, 1994 [DE] Germany .......................... 44 19 839.6

[51] Int. Cl.[6] ...................................................... B23C 5/20
[52] U.S. Cl. ........................... 407/115; 407/113; 407/114
[58] Field of Search ................................... 407/113, 114, 407/115, 116, 100

[56] References Cited

U.S. PATENT DOCUMENTS 4,988,242  1/1991  Pettersson ........................ 407/116
5,630,681  5/1997  Paya .................................. 407/114

FOREIGN PATENT DOCUMENTS 2515686  11/1975  Germany ......................... 407/116

*Primary Examiner*—A. L. Pitts
*Assistant Examiner*—Mark Willams
*Attorney, Agent, or Firm*—Herbert Dubno; Andrew Wilford

[57] ABSTRACT

A cutting insert for material removal machining includes a cutting face formed with a longitudinal cutting edge and with a succession of spaced apart rearwardly widening recesses extending along the cutting edge and at least one of the recesses having a respective rib extending along a longitudinal axis transversely to the cutting edge.

17 Claims, 5 Drawing Sheets

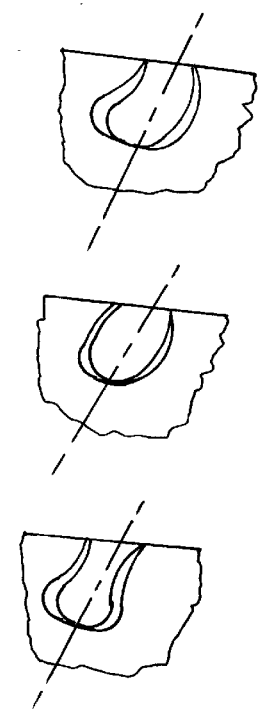
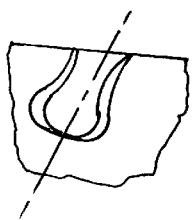
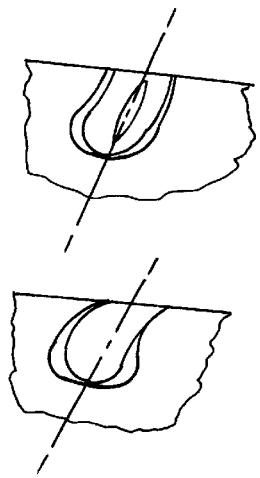
FIG.11a  FIG.11b  FIG.11c
FIG.11d  FIG.11e
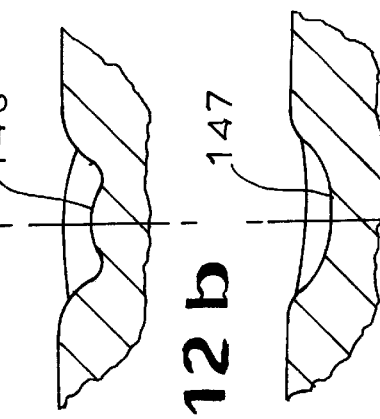
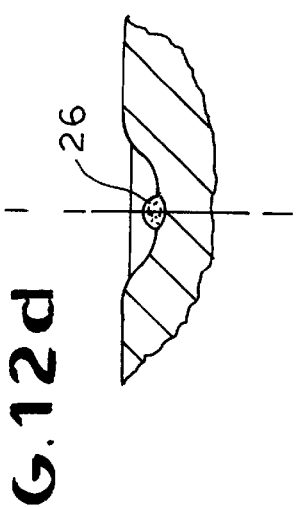
FIG.12a  FIG.12b  FIG.12c  FIG.12d

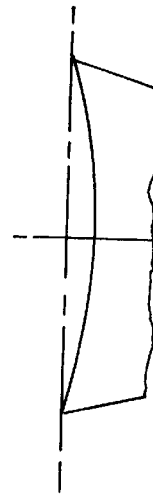
FIG.13a
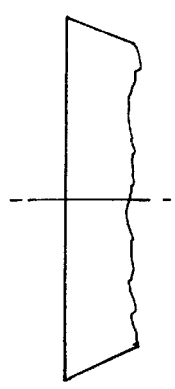
FIG.13b
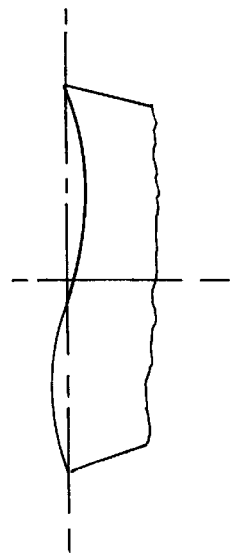
FIG.13c
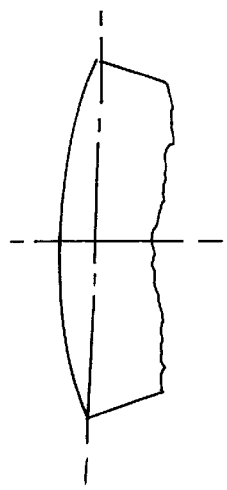
FIG.13d
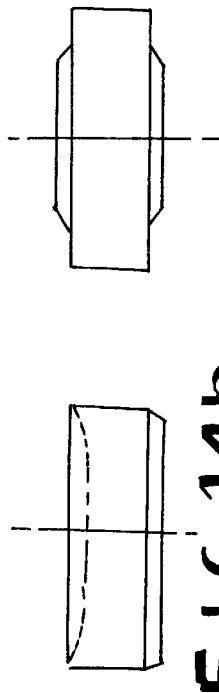
FIG.14a
FIG.14b
FIG.14c 5,839,858

CUTTING INSERT, ESPECIALLY FOR MILLING

CROSS-REFERENCE TO RELATED APPLICATIONS

This application is the US national phase of PCT application PCT/DE95/00435 filed 7 Jun. 1994 with a claim to the priority of German patent application P 44 19 839.6 filed 7 Jun. 1994.

FIELD OF THE INVENTION

The invention relates to a cutting insert for material-removing machining, in particular for milling, with a cutting face which has recesses which are arranged in a row along a cutting edge and which deform the chip transversely of its travel direction.

BACKGROUND OF THE INVENTION

German patent document 2,849,610 describes a cutting insert of this type which has recesses along the cutting edge whose width or greatest dimensions parallel to the cutting edge are larger than the spacings between adjacent or succeeding recesses. These recesses extend into the cutting face and have a generally sharp edge at the transition from the cutting edge to the cutting face. The recesses are either circular or have a generally rounded shape.

U.S. Pat. No. 3,973,308 describes a cutting insert with a bevel between the cutting edge and the cutting face and recesses which interrupt the edge of this face at the inner portions of the cutting face. The recesses are either generally rectangular or tapered away from the cutting edge, that is generally triangular.

U.S. Pat. No. 4,880,338 describes a cutting insert with a central raised plateau between which and the cutting edge is arranged a groove-like recess extending along the cutting edge as well as if necessary a bevel immediately at the cutting edge. The rising flanks and parts of the plateau are interrupted by generally drop-shaped recesses.

OBJECT OF THE INVENTION

It an object of the present invention to improve the cutting insert of the described type so that shaping and deflecting of a passing chip and its stabilization are improved, with the chip being subject to minimal friction on passing over the cutting face and the cutting force being held very small.

SUMMARY OF THE INVENTION

This object is attained by the cutting insert which is characterized in that the recesses widen to their rear ends away from the cutting edge preferably conically straight and a rib-shaped raised region is provided between a cutting edge and the first recess with a longitudinal axis which is arranged parallel to or forms the edge of the recess closest to the cutting edge.

Two things are important, namely that the passing chip undergoes at the flank closer to the cutting edge a deformation and deflection and is bent by the rib transversely to the travel direction while the opposite flank of the recess stabilizes the chip movement. Unlike in the embodiments known from the prior art the recesses get wider toward their rear ends so that the chip is advantageously not subjected to compression caused by increased friction.

Thus the recesses are generally trapezoidal in section parallel to the cutting edge and have lateral opposing flanks. Preferably this trapezoidal shape changes from a parallel plane close to the cutting edge to one remote therefrom such that the "base" as well as the "roof" increase in size. The trapezoidal shape has advantages in the plastic deformation of the chip transverse to its travel direction.

The edges of the lateral flanks (seen in top view) form with each other an angle of at least 5° forming the conical widening. Preferably the angle is between 5° and 15°. According to a particular embodiment of the invention the edge of the recess closest to the effective cutting corner forms with a perpendicular to the cutting edge an angle between 5° and 25°. A positive angle is such an angle that is measured clockwise.

The edges remote from the effective cutting edge form with a perpendicular to the cutting edge a positive angle, preferably both corners of the edge line having positive values and the angle of the edge remote from the cutting edge to the perpendicular being bigger than the angle of the edge close to the cutting edge.

The flanks are generally planar, preferably rounded where they merge with the planar floor of the recesses and/or with the cutting face.

According to a further embodiment of the invention the angle of the edge varies from recess to recess, preferably uniformly smaller away from a cutting corner. The recess are thus differently inclined relative to the cutting edge or to a perpendicular to the cutting edge.

The recesses extend up to the cutting edge or to a bevel running along the cutting edge or actually extend into the cutting edge and/or the bevel, so as to account for different cutting requirements.

The rib near the cutting corner forms at its summit the highest point in the region near the cutting edge, that is in the region which is ahead of a provided central plateau.

The edge of the rear flank remote from the cutting edge forms with the cutting edge an angle which can be negative, positive or even 0°. Preferably the edges of the back flanks of the first recess closer to the cutting edge extend at a negative angle to the cutting edge while the edges of the following recess form greater angles that are either smaller negative angles, 0°, or positive angles.

According to a further embodiment the recesses are inside a bevel running along the cutting edge. This chip-guiding step (or an already mentioned bevel) preferably has a positive angle.

The opposite lateral flanks have a flank angle (relative to a plane interconnecting the cutting corners) of 45°±20°, preferably the angle of the flank closer to the cutting edge being formed larger than that of the opposite flank.

The cutting face sections are at the same height between adjacent recesses along a cutting edge (but lower than the rib near the cutting edge). The length of the recesses measured perpendicular to the cutting edge lies between 3/10 and 4 mm, preferably between 1 and 3 mm. The greatest depth of the recess relative to the adjacent cutting face region lies between 1/10 and 7/10 mm. The width of the recesses measured parallel to the cutting edge—measured parallel to but at a spacing from the cutting edge—os of the same size or seven times as large. The absolute width of the recesses is between 1 mm and 5 mm, preferably 2 mm to 3.5 mm. At least two recesses are provided along each cutting edge.

BRIEF DESCRIPTION OF THE DRAWING

An embodiment of the invention is shown in the drawings. Therein:

FIGS. 8 and 9 are enlarged views of respective alternative formations of the recesses and bevel orientations;

FIGS. 11a through 11e are further variants of the recess in the cutting face shown in top view;

FIG. 12 is embodiments of the recesses shown in a cross sectional view parallel to the cutting edge;

FIGS. 13a through 13d are embodiments of the cutting edges, and

FIGS. 14a through 14c are various embodiments of indexable cutting plate types.

SPECIFIC DESCRIPTION

Figure 1:
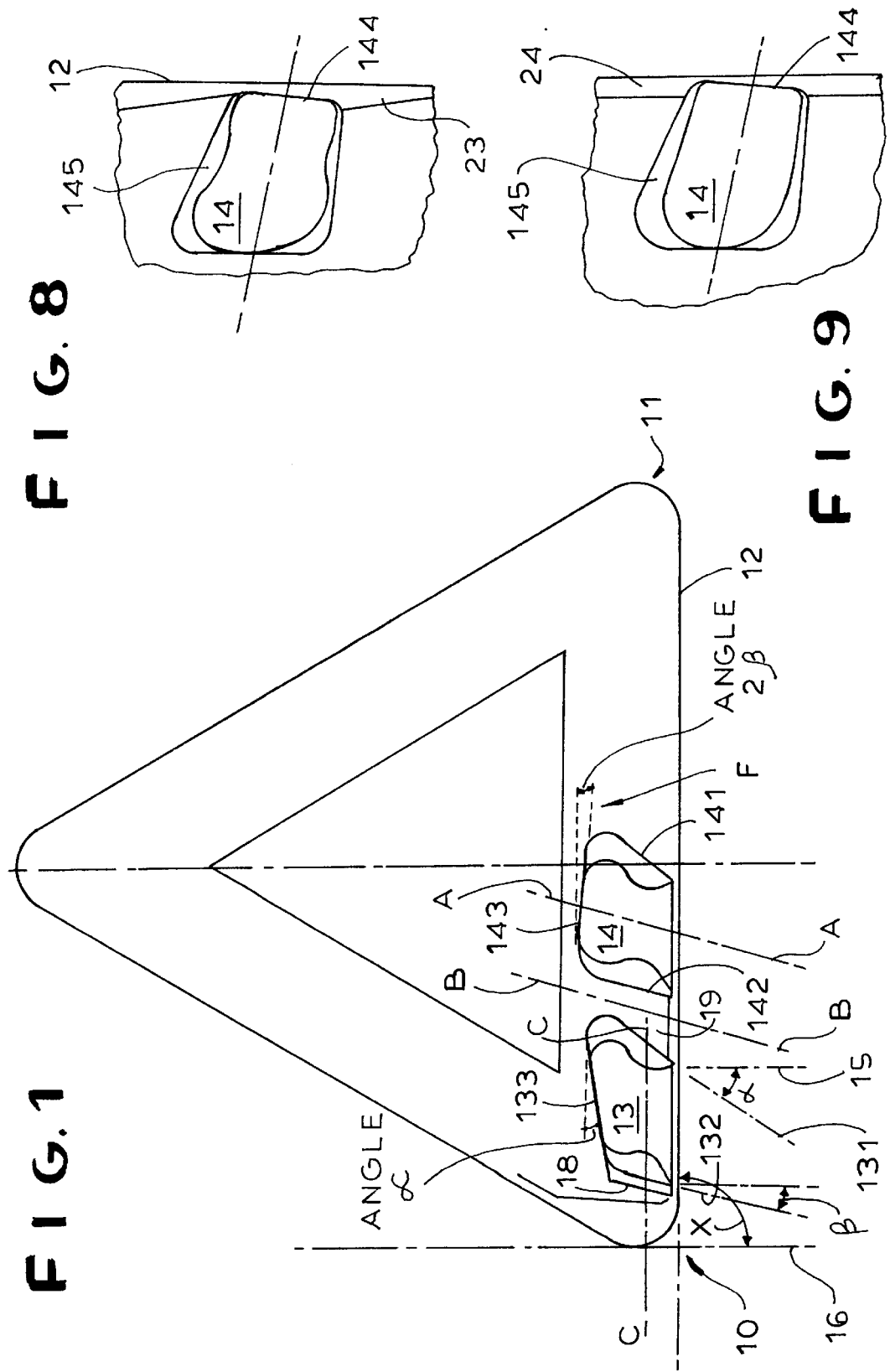
FIG. 1 is a top view of a cutting insert according to the invention.

The cutting plate shown in FIG. 1 has a generally triangular shape although other basic shapes such as rhombic, square, rectangular or forms derived from these shapes with beveled cutting edges or even round shapes are possible. The cutting insert is provided between with a cutting face F two cutting corners 10 and 11, that is along a main cutting edge 12, with several recesses 13 and 14 of which two are shown. These recesses have lateral edges that themselves form or whose extensions 131 and 132 form an angle of from 5° to 15° to each other. Here the edge 132 closer to the cutting corner is inclined at an angle of about 12° to a perpendicular to the cutting edge while the opposite edge 132 has an inclination of about 30°. The inclination angles α, β vary from recess to recess, being larger in regions remote from the cutting edge to α=14° and β=38°. The perpendicular to the cutting edge is shown at 15 and the section plane which establishes the attack angle X is shown at reference 16.

The rear flank or edge 133 forms with the cutting edge a negative angle of about 13° while the corresponding edge 143 of the second recess 14 forms a positive angle of about 10° with the cutting edge.

Figure 2:
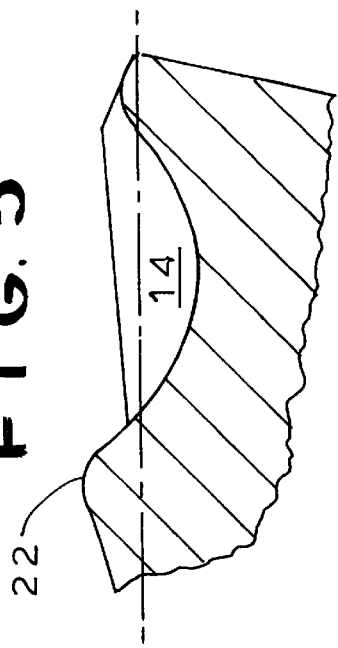
FIG. 2 is a sectional view of the cutting insert along lines A—A illustrated in FIG. 1.
Figure 3:
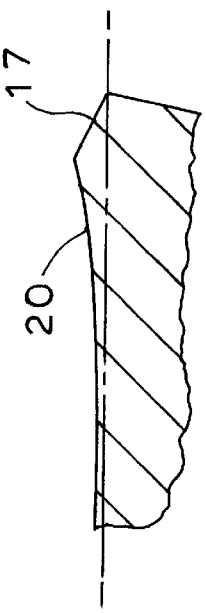
FIG. 3 is a sectional view of the cutting insert along lines B—B illustrated in FIG. 1.
Figure 4:
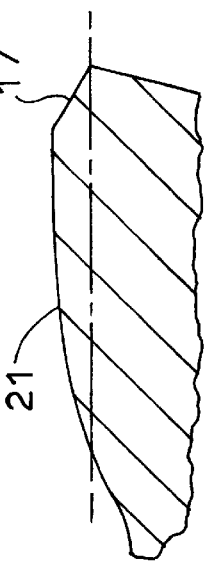
FIG. 4 is a sectional view of the cutting insert along lines C—C illustrated in FIG. 1.
Figure 6:
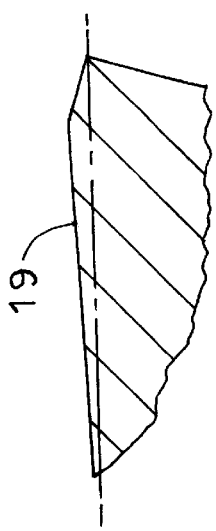
FIGS. 6 and 7 are variants of the sectional view as in FIG. 3.
Figure 7:
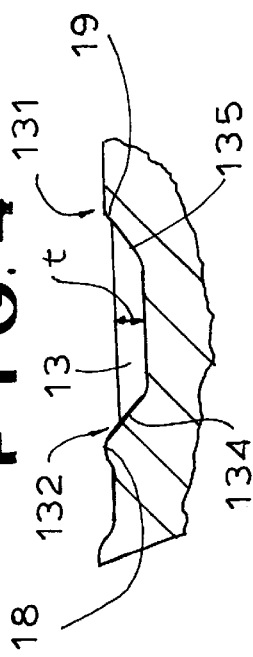

As can be seen from FIG. 2 the cutting insert has a bevel 17 directly at the cutting edge 12 and having a negative angle. The recess 14 extends into the chip-guiding step. The recesses 13 and 14 are formed as troughs and have a trapezoidal cross-sectional shape as can be seen in FIG. 4. Here the flank 134 closer to the cutting edge and the flank 135 remote from the cutting edge oppose each other, in this case at various angles of about 45° and 40° with the flank 134 closer to the cutting edge extending more steeply. The flank 134 runs seen toward the cutting edge into a rib-shaped raised region 18 whose summit, that is its highest part, extends parallel to the edge 142 or forms same. Between the recesses 13 and 14 there is a land 19 whose longitudinal section is seen in FIG. 3. This land has at the cutting edge a bevel and a linearly descending region extending directly therefrom into the center of the cutting insert. Alternately it is also possible for the descending region to run concave— see reference 20 —or convex—see reference 21 in FIGS. 6 and 7.

Figure 5:
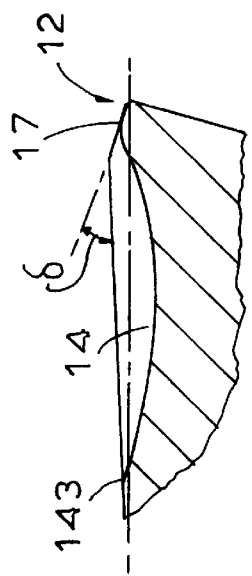
FIG. 5 is a variant of the sectional view as in FIG. 2.
Figure 10:
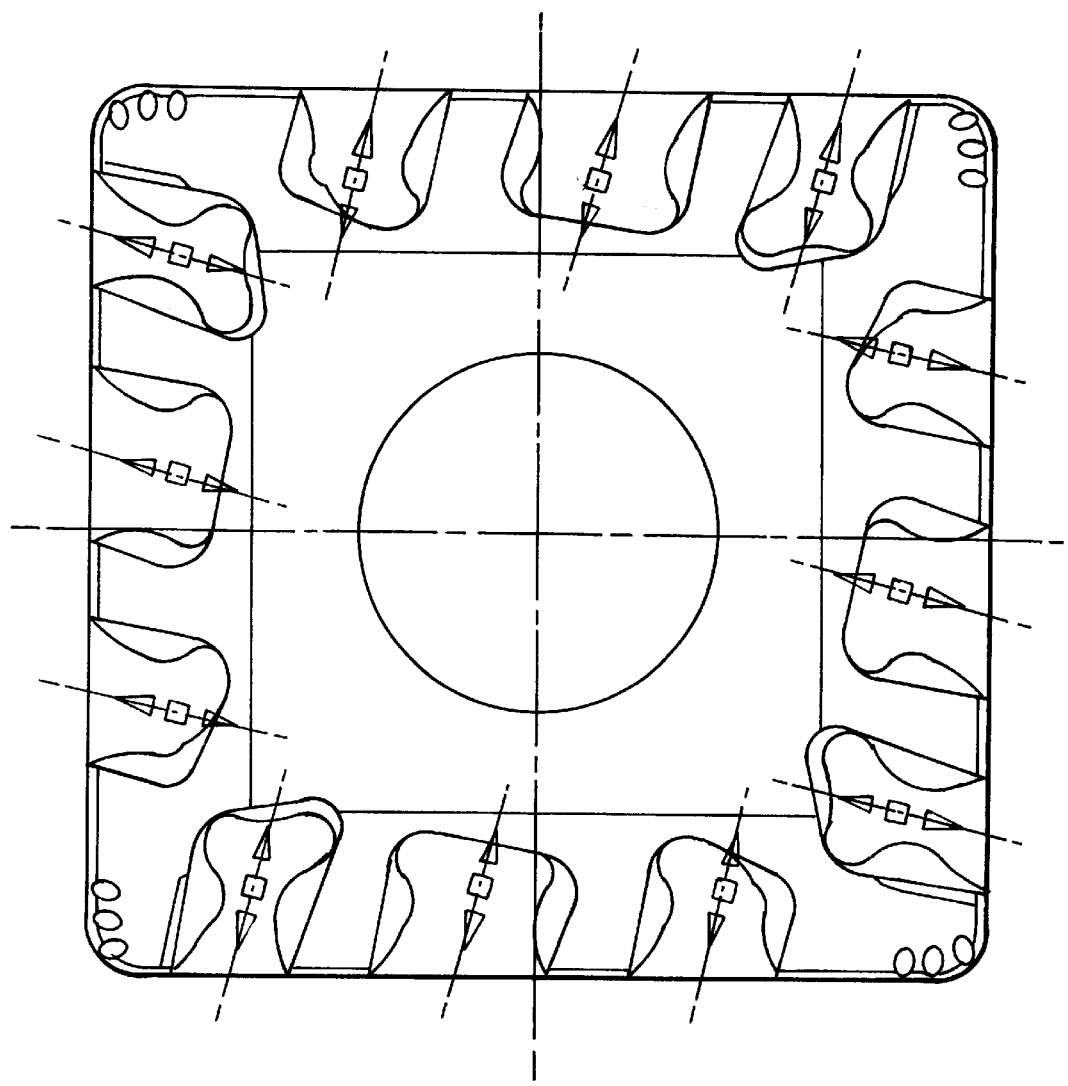
FIG. 10 is a further embodiment of a cutting insert according to the invention.

FIG. 5 is a view corresponding to a section along plane A—A where in distinction to FIG. 2 the cutting face has a high point 22 and descends rearward therefrom. FIGS. 8 and 9 are details of a top view of the cutting-face region where bevels 23 and 24 of variable width are provided. In the embodiment of FIG. 8 the width of the bevel 23 increases as it approaches the recess 14 and then decreases at its front edge 144 which extends at an angle to the cutting edge 12 and then however increases again. The form of the lateral flank 145 is generally determined by the geometry of the cutting face. The recess 14 (and/or 13) can merge without a transition into the central rear region into the cutting face. Further possible groove geometries are shown in FIGS. 12a through 12d with a convex floor 146 or a concave floor 147 or a generally planar floor 148 from which a raised chip-shaping element 25 can project. As shown in FIG. 12d this interrupted rib can correspond to the embodiment according to FIG. 10. A description of the longitudinal ribs along with all possible embodiments is seen in WO 92/21467 to which reference is made. The longitudinal ribs can according to the showing of FIG. 10 be wholly in the recess 13 and/or 14 or can extend past the rear regions of this recess.

FIGS. 11a through 11e shows further geometries of the recesses 13 and 14. The lateral edges can be convex (FIG. 11a), concave (FIG. 11b), or convex on one side and concave on the other (FIG. 11d), convex on both sides with the same curvature or generally linear (FIG. 11e). Possible embodiments of the cutting edge are shown in FIGS. 13a through 13d. The cutting edge can be straight, concave, convex, wavy, or straight with a positive free face, with a negative free face on one side (FIG. 11f) or with a 0° free face and cutting face plateau (FIG. 13g).

FIGS. 14a through 14c show different cutting plates with differently inclined free faces and/or recessed or raised middle regions.

We claim:

1. A cutting insert for material-removing machining, said insert formed with:
    a cutting edge extending between two cutting corners;
    a cutting face;
    a plurality of recesses arranged in a row along the cutting edge, each recess widening rearward away from the cutting edge and having a respective pair of lateral edges extending transversely of the cutting edge; and
    a raised rib having a longitudinal axis extending transversely of the cutting edge parallel to one lateral edge of a respective pair of one and other lateral edges where in said one lateral edge being closer to one of the cutting corners of the recess closest to one of the two cutting corners.

2. The cutting insert defined in claim 1 wherein the recesses are generally trapezoidal and have opposing flanks extending from a respective pair of one and other lateral edges of each recess.

3. The cutting insert defined in claim 2 wherein the respective pair of the lateral edges of each recess diverge at an angle of at least 5° with respect to each other toward a respective back edge of each recess remote from the cutting edge and bridging the respective pair of the lateral edges.

4. The cutting insert defined in claim 3 wherein the angle is at most 15°.

5. The cutting insert defined in claim 3 wherein the back edge remote from the cutting edge of the recess closest to the one cutting corner forms a negative angle with the cutting edge and the back edges of other recess farther from the one cutting corner than said recess closest thereto form a positive angle with the cutting edge.

6. The cutting insert defined in claim 2 wherein a respective one lateral edge of each pair of lateral edges of each recess closest to the one cutting corner forms an angle of between 5° and 25° to a perpendicular from the cutting edge.

7. The cutting insert defined in claim 6 wherein a respective other lateral edge remote from the one cutting corner of each pair of lateral edges of each recess forms with the cutting edge a smaller angle than the respective one lateral edge of each recess.

8. The cutting insert defined in claim 2 wherein each recess has a back edge bridging the respective lateral edges and forming an angle different from 0° with the cutting edge.

9. The cutting insert defined in claim 2 wherein each recess measures between 0.3 mm and 4 mm perpendicular to the cutting edge.

10. The cutting insert defined in claim 2 wherein each recess has a depth of between 0.1 mm and 0.7 mm.

11. The cutting insert defined in claim 2 wherein each recess has a width measured parallel to the cutting edge at front ends of the respective lateral edges equal to between 1 mm and 5 mm.

12. A cutting insert for material-removing machining formed with:

a cutting edge extending between two cutting corners;

a cutting face;

a plurality of recesses arranged in a row along the cutting edge, each recess widening rearward away from the cutting edge and having a respective pair of lateral edges extending transversely of the cutting edge, each of said recesses being generally trapezoidal and having respective opposing flanks extending from a respective pair of one and other lateral edges of each recess; and a raised rib having a longitudinal axis extending transversely of the cutting edge parallel to one lateral edge of a respective pair of lateral edges closer to one of the cutting corners of the recess closest to the one of the two cutting corner, the rib having a highest point close to the cutting edge.

13. A cutting insert for material-removing machining formed with:

a cutting edge extending between two cutting corners;

a cutting face;

a plurality of recesses arranged in a row along the cutting edge, each recess widening rearward away from the cutting edge and having a respective pair of lateral edges extending transversely of the cutting edge, each of said recesses being generally trapezoidal and having respective opposing flanks extending from a respective pair of one and other lateral edges of each recess;

a throughgoing bevel formed between the recesses and the cutting edge; and a raised rib having a longitudinal axis extending transversely of the cutting edge parallel to one lateral edge of a respective pair of lateral edges closer to one of the cutting corners of the recess closest to the one of the two cutting corner.

14. The cutting insert defined in claim 13 wherein the bevel extends at a negative angle to the cutting face.

15. The cutting insert defined in claim 13 wherein the bevel is of varying width measured perpendicular to the cutting edge.

16. A cutting insert for material-removing machining formed with:

a cutting edge extending between two cutting corners;

a cutting face;

a plurality of recesses arranged in a row along the cutting edge, each recess widening rearward away from the cutting edge and having a respective pair of lateral edges extending transversely of the cutting edge, each of said recesses being generally trapezoidal and having respective opposing flanks extending from a respective pair of one and other lateral edges of each recess;

a respective plateau formed between adjacent recesses, the recesses having measured parallel to the cutting edge a total width equal to between seven and one times a total width of the plateaus measured parallel to the cutting edge a cumulative width of said recesses; and a raised rib having a longitudinal axis extending transversely of the cutting edge parallel to one lateral edge of a respective pair of lateral edges closer to one of the cutting corners of the recess closest to the one of the two cutting corner.

17. A cutting insert for material-removing machining formed with:

a cutting edge extending between two cutting corners;

a cutting face;

a plurality of recesses arranged in a row along the cutting edge, each recess widening rearward away from the cutting edge and having a respective pair of lateral edges extending transversely of the cutting edge, each of said recesses being generally trapezoidal and having opposing flanks, each flank extending from a respective pair of one and other lateral edges of each recess and having a respective width that increases away from the cutting edge; and a raised rib having a longitudinal axis extending transversely of the cutting edge parallel to one lateral edge of a respective pair of lateral edges closer to one of the cutting corners of the recess closest to one of the two cutting corner.

* * * * *